United States Patent [19]

Yamada

[11] Patent Number: 5,038,223
[45] Date of Patent: Aug. 6, 1991

[54] IMAGE PROCESSING METHOD AND APPARATUS FOR IMPARTING A PICTORIAL OR PAINTER-LIKE EFFECT

[75] Inventor: Shigeki Yamada, Yokohama, Japan

[73] Assignee: Canon Kabushiki Kaisha, Tokyo, Japan

[21] Appl. No.: 630,797

[22] Filed: Dec. 24, 1990

Related U.S. Application Data

[63] Continuation of Ser. No. 314,142, Feb. 23, 1989, abandoned.

[30] Foreign Application Priority Data

| Feb. 29, 1988 | [JP] | Japan | 63-44441 |
| Feb. 29, 1988 | [JP] | Japan | 63-44442 |
| Feb. 29, 1988 | [JP] | Japan | 63-44443 |
| Feb. 29, 1988 | [JP] | Japan | 63-44453 |

[51] Int. Cl.$^5$ ............................................. H04N 1/40
[52] U.S. Cl. .................................. 358/445; 358/450; 358/453; 382/44
[58] Field of Search ............... 358/409, 458, 448, 453, 358/445; 382/47, 48, 46, 45, 44, 50

[56] References Cited

U.S. PATENT DOCUMENTS

| 3,997,912 | 12/1976 | Zsagar | 358/903 |
| 4,189,743 | 2/1980 | Schure et al. | 358/903 |
| 4,717,964 | 1/1988 | Abe et al. | 358/298 |
| 4,741,046 | 4/1988 | Matsunawa et al. | 382/9 |
| 4,953,227 | 8/1990 | Katsuma et al. | 358/456 |
| 4,956,872 | 9/1990 | Kimura | 382/45 |

FOREIGN PATENT DOCUMENTS

| 62-179059 | 8/1987 | Japan. |
| 62-179060 | 8/1987 | Japan. |
| 62-179061 | 8/1987 | Japan. |

*Primary Examiner*—Edward L. Coles, Sr.
*Attorney, Agent, or Firm*—Fitzpatrick, Cella, Harper & Scinto

[57] ABSTRACT

An image processing method and apparatus for converting original image data into aesthetic image data having a pictorial touch includes replacing original image data in an area which is at least a portion of the original image data with synthesized painting data obtained from information based on the original image data in the appointed area and other multi-toned sample painting data. Preferably, plural types of sample painting data are provided, the properties of the original image data are detected in every locality, corresponding sample painting data are selected from the plural types of sample painting data in dependence upon the detected properties.

14 Claims, 6 Drawing Sheets

| LARGE BRUSH PATTERN | DIRECTIONLESS | OBLONG VERTICALLY | OBLONG HORIZONTALLY |
|---|---|---|---|
| FIG. 6(A) | FIG. 6(B) | FIG. 6(C) | FIG. 6(D) |

| LARGE BRUSH PATTERN | DIRECTIONLESS | OBLONG VERTICALLY | OBLONG HORIZONTALLY |
|---|---|---|---|
| FIG. 6(E) | FIG. 6(F) | FIG. 6(G) | FIG. 6(H) |

IMAGE PROCESSING METHOD AND APPARATUS FOR IMPARTING A PICTORIAL OR PAINTER-LIKE EFFECT

This application is a continuation of application Ser. No. 07/314,142, filed Feb. 23, 1989 now abandoned.

BACKGROUND OF THE INVENTION

FIELD OF THE INVENTION

This invention relates to an image processing method and an apparatus therefor. More particularly, the invention relates to an image processing method and apparatus for converting original image data having a "flat" appearance, such as that of a photograph, into aesthetic image data having a pictorial (painter-like) touch.

Mosaic processing is one example of a method employed in the art for creating an aesthetic image by applying image processing technology. This entails executing mosaic processing of an image in which, say, a total of 25 pixels in a 5×5 array of pixels in the X and Y directions serves as a block unit. More specifically, letting an item of original image data having an address (x,y) be represented by a(x,y), an item of image data a'(x,y) resulting from mosaic processing is determined by the following equation:

$$a'(5m-i, 5n-j) = a(5m-3, 5n-3) \quad (1)$$

where i, j: pixel numbers (1, 2, 3, 4, 5 each)

m, n: block numbers (1, 2, 3, ... each)

That is, the central item of image data $a(5m-3, 5n-3)$ in each block of the original image data is a representative value. Mosaic conversion processing is performed by replacing all of the items of image data $a'(5m-i, 5n-j)$ that have been subjected to mosaic processing in the relevant block by the abovementioned representative value. It should be noted that the representative value is not limited to the central item of pixel data, for any item of pixel data within the block can serve as a representative value. There are also cases in which the mean value within a block is employed as the representative value.

Applications of mosaic processing to pictorial representation are disclosed in Japanese Patent Application Laid-Open (KOKAI) Nos. 62-179059, 62-179060 and 62-179061. According to these disclosures, the mosaic pattern is generated at random positions by a random function, or the size of a mosaic pattern is varied in dependence upon the contrast or spatial frequency characteristic of the original image data.

However, the conventional mosaic pattern is expressed by binary data of value "0" or "1". For this reason, gradations in coloring materials or pigments, build-up or mounding of the coloring materials and other pictorial touches cannot be expressed. Only a picture having a flat impression can be obtained, and it is impossible to achieve a high-grade image conversion.

In addition, the prior art is such that one type of shape pattern (brush pattern) constituting a mosaic is prepared per image, and a portion of this shape pattern is used by being cut from the pattern in dependence upon the contrast information and spatial frequency information obtained from the original image data. As a consequence, the shape of the brush pattern is destroyed and a real brush-like touch cannot be expressed.

Furthermore, with an apparatus of this type, the prior art requires the provision of separate memory means as a so-called working area for image processsing and the like. However, this necessitates a large memory capacity and is extremely uneconomical.

The assignee of the present invention has already proposed the case indicated below, in which the binary mosaic pattern is varied in dependence upon the edge direction detected;

U.S. application Ser. No. 174,979 (filed Mar. 29, 1988)

However, further improvements are sought.

SUMMARY OF THE INVENTION

An object of the present invention is to provide an image processing method and apparatus through which image conversion of a higher grade can be performed.

Another object of the present invention is to provide an image processing method and apparatus through which a realistic brush-like touch can be expressed.

Still another object of the present invention is to provide a novel image processing method and apparatus having various applications not limited to representation of the abovementioned brush-like touch.

A further object of the present invention is to provide the aforementioned image processing apparatus in which a major savings in memory capacity is achieved.

According to the present invention, the foregoing objects are attained by providing an image processing method for converting original image data into aesthetic image data having a pictorial touch, comprising the steps of appointing an area which is at least a portion of the original image data, extracting information based on the original image data in the appointed area, obtaining synthesized painting data from the extracted information and other multi-toned sample painting data, and replacing the original image data in the appointed area with the synthesized painting data obtained.

In this way, multi-toned sample painting data indicative of a painting produced by a paintbrush, for example, are synthesized with regard to original image data having a flat appearance, as in the case of a photograph, so that such brush-like touches as texture, coloring material gradations and physical build-up of coloring materials employed when an artist paints a picture by actually using a brush can be faithfully expressed.

The foregoing paves the way for a variety of high-quality image conversions.

In a preferred embodiment, the synthesized data are obtained by multiplying each item of pixel data contained in the multi-toned sample painting data by the extracted information.

In another preferred embodiment, the method of the invention further includes providing plural types of sample painting data, detecting, for every locality, the properties of the original image data, and selecting corresponding sample painting data from the plural types of sample painting data in dependence upon the detected properties.

The foregoing makes it possible to readily generate image data having a variety of pictorial touches conforming to the properties of the original picture.

Further, according to another aspect of the invention, the foregoing objects are attained by providing an image processing method for converting original image data into aesthetic image data having a pictorial touch, comprising the steps of (a) storing original image data in a memory, (b) extracting an edge portion with regard to the stored original image data, (c) randomly generating painting starting positions based on predetermined sample painting data, (d) determining whether the extracted edge portion is present at the generated painting starting positions or at positions in the course of painting processing, (e) if an edge portion is found not to be present by the abovementioned determination, executing painting processing for each pixel based on the sample painting data for a thick shape and returning to the step (d) until painting processing regarding the sample painting data for the thick shape ends, and returning to the step (c) at the end of painting processing, and (f) if an edge portion is found to be present by the abovementioned determination, executing painting processing based on the sample painting data for a fine shape, and returning to the step (c).

The foregoing makes it possible to execute image processing faithful to the original picture.

In a preferred embodiment, the method includes providing a single type of sample painting data for the thick shape, sequentially subjecting this single type of sample painting data for a thick shape to rotation processing at minute angular increments and within a range of a predetermined angle at maximum, and executing this rotation processing whenever painting processing ends with regard to the single type of sample painting data for the thick shape.

When the single type of sample painting data for the thick shape is thus subjected to rotation processing in the manner described above, memory is saved and processing is simplified. Moreover, since the painting starting positions are generated randomly, it is possible to express a pictorial image having the irregular brush-like touch obtained when an artist actually uses a paintbrush to paint a picture.

In a preferred embodiment, the method further includes providing plural types of fine shape sample painting data having directionality, detecting the direction of the extracted edge portion, and selecting, in dependence upon the direction of the detected edge portion, corresponding sample painting data from the plural types of fine shape sample painting data having directionality.

The foregoing makes it possible to paint an edge portion clearly and faithfully.

According to the present invention, the foregoing objects are attained by providing an image processing apparatus for converting original image data into aesthetic image data having a pictorial touch, comprising first memory means for storing original image data, second memory means for storing predetermined multi-toned sample painting data, area setting means for appointing an area which is at least a portion of the original image data stored in the first memory means, information extracting means for extracting information based on the original image data in the area appointed by the area setting means, arithmetic means for obtaining synthesized painting data from the information extracted by the information extracting means and the multi-toned sample painting data stored in the second memory means, and substituting means for replacing the original image data in the area appointed by the area setting means with the synthesized painting data obtained by the arithmetic means.

In a preferred embodiment, the arithmetic means obtains the synthesized painting data by multiplying each item of pixel data contained in the multi-toned sample painting data stored in the second memory means by the information extracted by the information extracting means.

According to another aspect of the present invention, the foregoing objects are attained by providing an image processing apparatus for converting original image data into aesthetic image data having a pictorial touch, comprising first memory means for storing original image data, second memory means for storing plural types of sample painting data, detecting means for detecting, for every locality, properties of the original image data stored in the first memory means, selecting means for selecting corresponding sample painting data from the plural types of sample painting data in dependence upon the properties detected by the detecting means, information extraction means for extracting information based on the original image data in an area detected by the detecting means, arithmetic means for obtaining synthesized painting data from the information extracted by the information extraction means and sample painting data selected by the selecting means, and substitution means for replacing the original image data in the area detected by the detecting means with the synthesized painting data obtained by the arithmetic means.

According to yet another aspect of the invention, the foregoing objects are attained by providing an image processing apparatus for converting original image data into aesthetic image data having a pictorial touch, comprising first memory means for storing original image data, second memory means for storing sample painting data for a thick shape and fine shape, edge extracting means for extracting an edge portion with regard to the original image data stored in the first memory means, position generating means for randomly generating painting starting positions based on the sample painting data, decision means for determining whether the edge portion extracted by the edge extracting means is present at the painting starting positions generated by the position generating means, selecting means for selecting the sample painting data for the thick shape if an edge portion is found not to be present by the determination performed by the decision means and the sample painting data for the fine shape if an edge portion is found to be present by the determination performed by the decision means, information extracting means for extracting information based on the original image data in an area at a position generated by the position generating means, arithmetic means for obtaining synthesized painting data from the information extracted by the information extracting means and the sample painting data selected by the selecting means, and substituting means for replacing the original image data in the area at the position generated by the position generating means with the synthesized painting data obtained by the arithmetic means.

In a preferred embodiment, the second memory means stores plural types of fine shape sample painting data having directionality, and the apparatus further includes detecting means for detecting the direction of the edge portion extracted by the edge extracting means, wherein the selecting means selects, in dependence upon the direction of the edge portion detected by the detecting means when the edge portion is found to be present by the determination performed by the decision means, corresponding sample painting data from the plural types of fine shape sample painting data having directionality stored in the second memory means.

According to yet another aspect of the invention, the foregoing objects are attained by providing an image processing apparatus for gray level-converting original image data of n bits per pixel into image data of m bits per pixel, where m is less than n, and outputting the converted image data, comprising memory means for storing original image data of n bits per pixel, processing means which uses less than (n-m) low-order bits of the original image data in the memory means as a working area, and gray level converting means for gray level-converting an n-bit output of the memory means into corresponding m-bit image data, with the n-bit output serving as an address input.

The image processing apparatus of this aspect of the invention makes it possible to save on memory significantly and reduce cost by a wide margin.

According to yet another aspect of the invention, the foregoing objects are attained by providing an image processing apparatus, comprising dividing means for dividing an original image into blocks each composed of plural pixels, detection means for detecting the edge direction of image from said original image, selecting means for selecting corresponding multi-toned pattern data from plural of prescribed multi-toned pattern data in accordance with the edge direction detected by said detection means, and mosaic processing means for mosaic processing said divided blocks based on the multi-toned pattern data selected by said selecting means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of the invention will now be described in detail with reference to the accompanying drawings.

Figure 1:
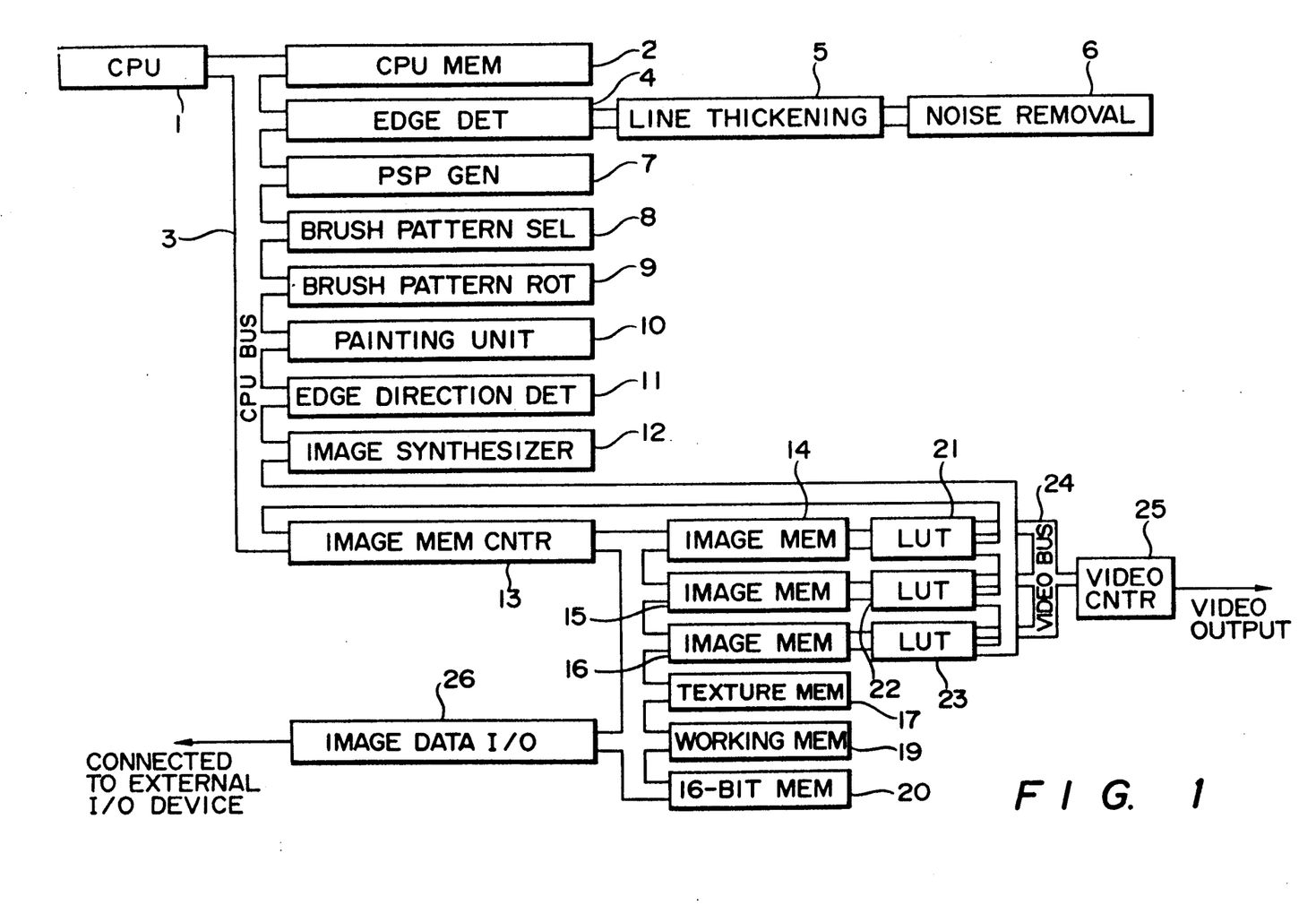
FIG. 1 is block diagram illustrating an embodiment of an image processing apparatus according to the present invention.

FIG. 1 is a block diagram illustrating an embodiment of an image processing apparatus according to the present invention. Numeral 1 denotes a central processing unit (CPU) for main control of the apparatus of this embodiment. The CPU 1 has a CPU memory 2. A picturizing processing program, of the kind shown for example in FIG. 2, executed by the CPU 1, and parameters and the like necessary for this processing are stored in a ROM or RAM, not shown. A CPU bus 3 comprises an address bus, data bus and control bus of the CPU 1.

An image reading device or an image output device, not shown, is connected to a image data I/O unit 26 for input/output of image data before and after picturizing processing. Image memories (IMAGE MEM) 14, 15, 16 of eight bits per pixel respectively store original image data of the three primary colors R (red), G (green) and B (blue) read in via the image data I/O unit 26. A texture memory 17 also of eight bits per pixel stores image data indicative of a canvas (knit pattern) such as is used in oil painting, by way of example. A working memory 19 of eight bits per pixel is for temporarily storing the results of processing performed with regard to the image data stored in the image memories 14-16. A 16-bit memory 20 of 16 bits per pixel is for temporarily storing the results of a product-summing operation performed with regard to the image data in the image memories 14-16. Numerals 21 through 23 denote look-up tables (LUT's) each comprising a high-speed RAM and each having a 256×8-bit memory capacity in which a gray tone conversion table is capable of being rewritten by the CPU 1. Each of the LUT's 21-23 has eight (0-255 addresses) address lines, the address data being given by image data (0-255 tones) outputted by respective ones of the image memories 14-16. Each of the LUT's 21-23 has eight read-out data lines connected to a video bus 24. The CPU bus 3 is connected directly to each of the LUT's 21-23 so that the contents of the LUT's 21-23 can be read/written by the CPU 1 via the CPU bus 3 at any time. A video controller (VIDEO CNTR) 25 is connected to a CRT display unit, video printer or the like, not shown, so that image data before and after picturizing processing can be monitored.

An edge detector (EDGE DET) 4 detects the edge portion in an original image from image data, which is obtained by color-synthesizing the image data in each of the image memories 14-16 so as to conform to the luminosity curve of human beings, converts the detected edge portion into a binary code and outputs the result in the form of binary-coded edge data. This binary-coded edge data is obtained in order to divide the original image data into an edge portion (contrast portion) and flat portion, thereby to facilitate processing for applying the properties and shapes of different brush patterns. A line thickening processor 5 applies pattern line thickening processing to the binary-coded edge data output of the edge detector 4. Numeral 6 denotes a waste processor (NOISE REMOVAL) which disposes of noise patterns having a small isolated area from the pattern resulting from line thickening processing, and which leaves only the necessary edge pattern portion. An edge direction detector 11 makes it possible to select a suitable brush pattern in a brush pattern selector 8, described below, by detecting whether or not the detected edge portion has directionality and, if it does, the direction of the edge portion. A painting starting position generator (PSP GEN) 7 has built-in random function generating means, not shown, for randomly generating the painting starting positions of brush pattern data, described below.

Numeral 8 denotes a brush pattern selector which, based on the results of edge detection, selects brush pattern data from plural types of small multi-valued (or binary) brush pattern data stored beforehand in a ROM (not shown), or from large multi-valued (or binary) brush pattern data stored in a ROM (not shown) in a brush pattern rotator 9, described below, and successively generated by pattern rotation processing. In the present embodiment, the brush pattern rotator 9 is such that a single type of large multi-valued (or binary) basic brush pattern data is stored beforehand in a ROM (not shown). By sequentially applying a rotating effect to this basic brush pattern, in essence a plurality of types of brush pattern data are generated. Numeral 10 denotes a painting unit for painting (synthesizing) brush pattern data selected by the brush pattern selector 8 at the painting starting positions randomly generated on the original image data. For instance, in an example where the brush pattern data are composed of multiple values, original image data in the vicinity of a generated painting starting position are converted into image data indicative of an uneven, glossy surface of the kind that would be painted by a brush in a color approximating the pertinent original image data. An image synthesizer 12 synthesizes the texture image of a canvas or the like by applying processing to the image data resulting from the painting processing. An image memory controller 13 performs the required control of the image memories 14–16 and LUT's 21–23 in synchronism with the respective processing operations performed by the units extending from the edge detector 4 to the image synthesizer 12.

Figure 2:
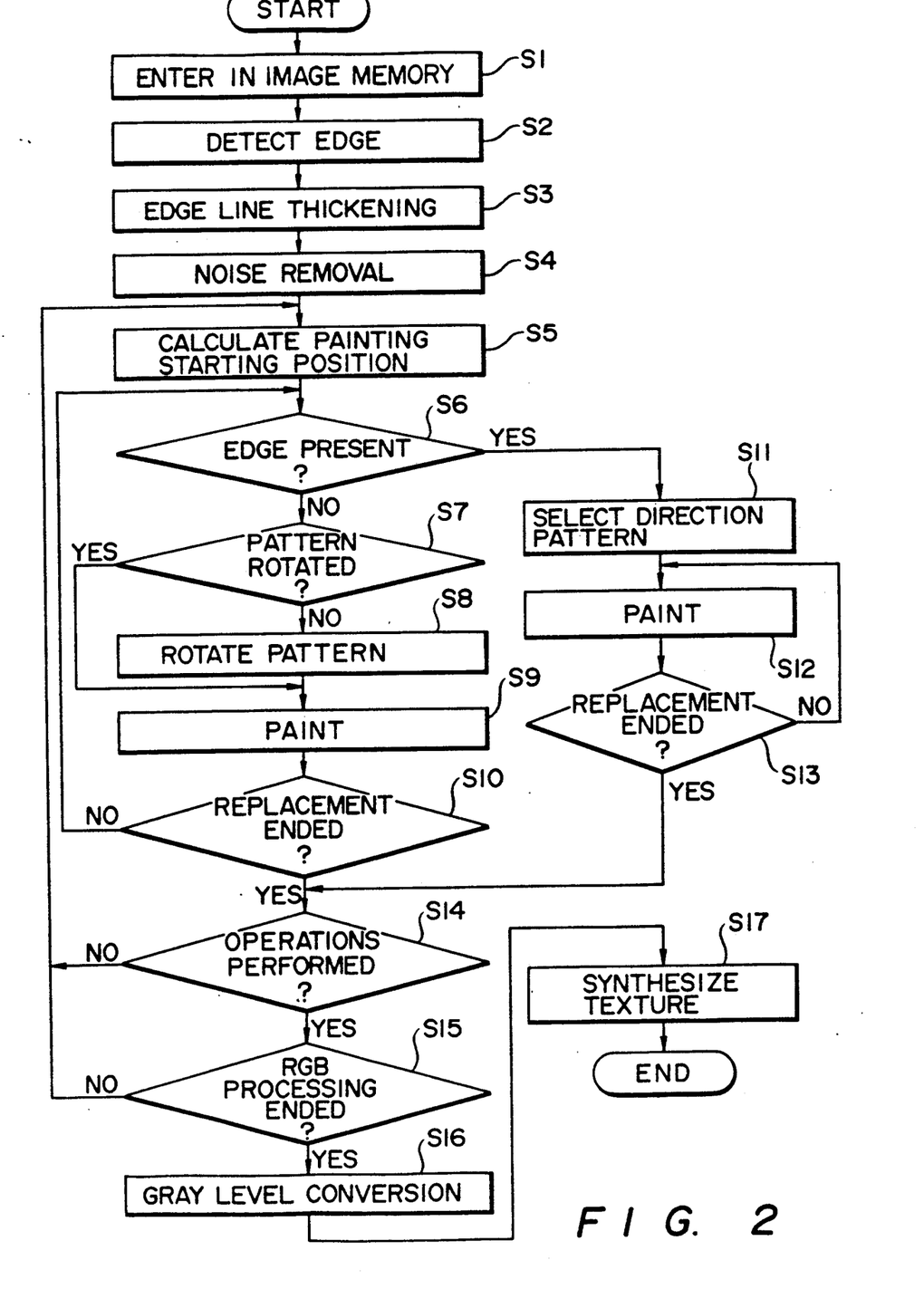
FIG. 2 is a flowchart illustrating picturizing processing according to the embodiment of FIG. 1.

FIG. 2 is a flowchart illustrating a picturizing processing procedure of an embodiment of the invention. In the description to follow, original image (density) data of address (x,y) will be expressed by $a_i(x,y)$. Here the subscript i is written R, G, B when the respective R, G and B image data are expressed individually. Further, each item of image data $a_i(x,y)$ is composed of eight bits (which are capable of expressing 0–255 tones). The value of data indicative of maximum density (maximum darkness) is tone 0, and the value of data indicative of minimum density (maximum brightness) is tone 255.

STEP S1

The CPU 1 accepts original image data R, G, B applied thereto from the outside via the image data I/O unit 26, and stores these data in the image memories 14, 15, 16, respectively.

Figure 3:
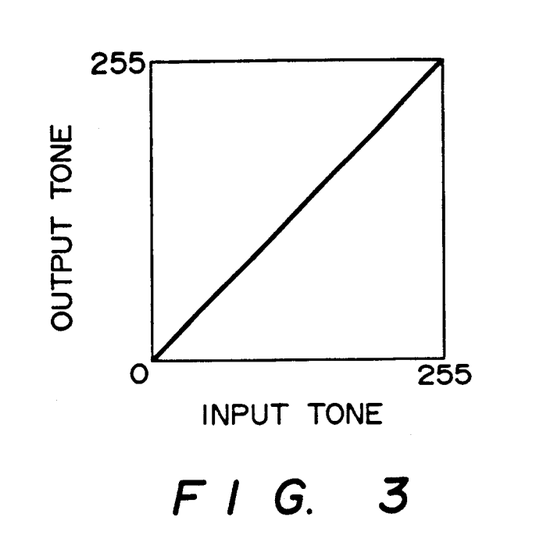
FIG. 3 is a view showing an example of a gray level transformation table characteristic in an initial state of LUT's 21-23 of the embodiment of FIG. 1.

At this time the contents of the LUT's 21–23 exhibit a standard conversion characteristic in which input and output are equal, as shown in FIG. 3.

STEP S2

The edge detector 4 performs edge extraction based on the original image data R, G, B in the respective image memories 14, 15, 16. In this edge detection processing, the first step is to create image data which conforms to the luminosity curve of human beings in accordance with the following equation:

$$a(x,y) = \frac{1}{10}[3a_R(x,y) + 6a_G(x,y) + a_B(x,y)] \quad (2)$$

In accordance with Eq. (2) above, the original image data R, G, B are synthesized at a ratio of 0.3:0.6:0.1. Since a picture is something to be appreciated by the eye, first the original image data are color-synthesized in accordance with the luminosity curve of human beings and edge evaluation is performed. Further, in order to compute the sum of the products within the brackets on the right side of Eq. (2) at this time, the result of summing the produced at each stage is temporarily stored in the 16-bit memory 20. In addition, the result of multiplying the sum of the products within the brackets by 1/10 is stored in the working memory 19.

Figure 4:
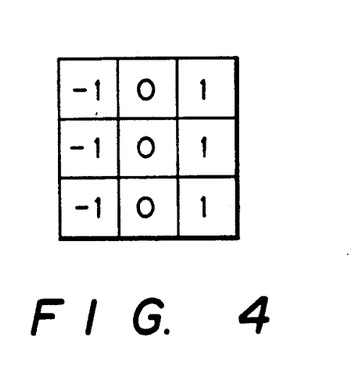
FIG. 4 is a view illustrating an example of a differential operator employed in the embodiment of FIG. 1.

Next, the image data in the working memory 19 are subjected to edge extraction processing using a differential operator in the form of a (3×3) matrix, by way of example. An example of a differential operator employed by the present embodiment is illustrated in FIG. 4. This differential operator detects an edge (contrast) of the kind that increases brightness in the rightward direction of the image.

In the prior art, the results of such edge detection are stored in a separately provided memory. In the present embodiment, however, the four high-order bits of these results are stored in the four low-order bits of the image memory 14, assuming that results of such edge detection are composed of eight bits per pixel. The reason is as follows.

Figure 10:
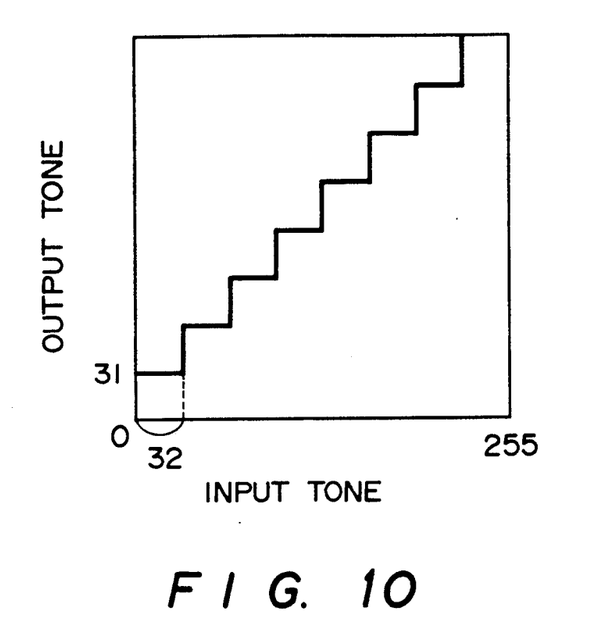
FIG. 10 is a view showing an example of a gray level transformation table characteristic of LUT's 21-23 of the embodiment of FIG. 1.

In the present embodiment, image data for which painting has ended are outputted upon being temporarily compressed into eight tones in processing described below. At this time the input/output tone relationship in the LUT's 21–23 is as shown in FIG. 10, by way of example. Specifically, in a range of input tones of from 0 to 31 (256 tones/8) in FIG. 10, the output tone is 31 (=0th tone). Thus the relationship is such that the output increases by one tone at a time whenever the input increases by 32 tones. Essentially, therefore, no use is made of the five low-order bits which express the tones of from 0 to 31 in the original image data R, G, B, and the results of gray level conversion are entirely unaffected even if this portion of the original image data is destroyed. According, in the present embodiment, the five low-order bits of the image memories 14–16 can be used freely as a working area.

Stating this in general terms, if image data having n tones are gray-level converted into image data having m tones (n>m), the low-order bit areas which store tones from 0 to [(n/m)−1] are allotted to be working area.

Figure 5:
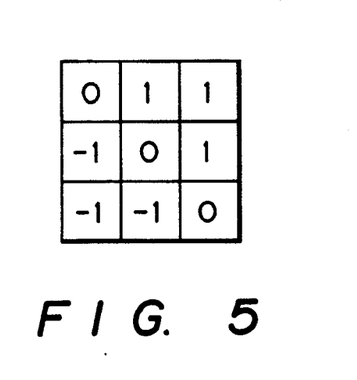
FIG. 5 is a view illustrating a differential operator in a case where the differential operator of FIG. 4 is rotated by $\pi/4$ in the counter-clockwise direction.

Next, the differential operator of FIG. 4 is rotated counter-clockwise by $\pi/4$ to obtain the differential operator of FIG. 5. This differential operator detects an edge of the kind that increases brightness in the upper right-hand direction of the image. The four high-order bits of the result of this edge detection and the results of detection stored in the four low-order bits of image memory 14 are compared, with the larger being stored in the four low-order bits of image memory 14. Thereafter, and in similar fashion, the differential operator is rotated counter-clockwise $\pi/4$ at a time and, from among the edge detection results as seen from a total of eight directions, the four high-order bits of the largest are detected and stored in the four low-order bits of image memory 14 As a result, the maximum edge component with regard to all pixels of the image data converted into a visual image is extracted and stored in the four low-order bits of the image memory 14.

Next, the four low-order bits of image memory 14 are subjected to digitizing processing at a predetermined threshold value, a pixel construed to be an edge (i.e., above the threshold value) is replaced by bit "1", a pixel construed to be below the threshold value is replaced by bit "0", and the "1" or "0" value is written in the low-order bit of the image memory 14. Thus, binary-coded edge pattern data relating to the edge component of the original image is stored in the low-order bit of the image memory 14.

STEP S3

The binary-coded edge pattern data generated in step S2 is too fine for the purpose of performing the processing described below. Accordingly, line thickening processing is applied to the binary-coded edge pattern. This line thickening processing is carried out in accordance with Eq. (3) below, where a(x,y) represents the binary-coded edge pattern data of interest in the image memory 14.

Specifically, when $a(x,y)=1$ holds, we have $$a(x+i, y+j) = 1 \qquad (3)$$

where i and j are integers which satisfy the relations $-3 \leq i \leq 3$, $-3 \leq j \leq 3$.

The results of this line thickening processing are stored in the low-order bit of the image memory 15, by way of example.

STEP S4

The line-thickened edge pattern data obtained in step S3 usually contains many small isolated noise patterns. With respect to all edge pattern data stored in the low-order bit of the image memory 15, the waste processor 6 calculates an area based on a decision regarding the absence or presence of the connectivity of the data and discards as a noise pattern that having an area less than a predetermined area. The decision regarding the absence or presence of connectivity is performed in accordance with Eq. (4) below, where a(x,y) represents the edge pattern data of interest in the image memory 15.

Specifically, when $a(x,y)=1$ holds, the following is examined:

$$a(x+i, y+j) = 1 \qquad (4)$$

where i and j are integers which satisfy the relations $-1 \leq i \leq 1$, $-1 \leq j \leq 1$ That is, items of data are construed to have mutual connectedness if even one of the conditions $a(x+i, y+j)=1$ is satisfied.

STEP S5

In step S5, the painting starting position generator 7 generates information relating to the painting starting positions of brush patterns The painting positions of a brush pattern mar the natural quality of a pictorial representation when they are generated sequentially in a systematic fashion. For this reason, painting starting positions in the present embodiment are generated randomly. In other words, painting starts at random positions.

The generation of painting starting position information is carried out first with regard to the original image data R. The painting starting position generator 7 has built-in random number generating means, not shown. By way of example, in response to receiving three random-number generating parameters (an integer which gives a random-number generation sequence in a row direction, an integer which gives a random-number generation sequence in a column direction, and the number of random numbers generated) from the CPU 1, the random number generating means generates random numbers in the corresponding mode. The painting starting position generator 7 decides the painting starting position $(x_m, y_m)$ of a brush pattern in accordance with the generated random number.

In the present embodiment, the random-number generating parameters are made the same when processing the original image data G and B. Therefore, the painting starting positions and number of painting operations thereof are the same as those of the original image data R.

STEP S6

Step S6 calls for a determination as to whether line-thickening edge pattern data are present at the generated painting starting position. In the absence of edge pattern data at the painting starting position (i.e., edge pattern data=0), the program proceeds to a routine from step S7 onward, in which painting is performed with large brush pattern data. If edge pattern data are present at the abovementioned painting starting position (i.e., edge pattern data=1), then the program proceeds to a routine from step S11 onward, in which painting is performed with small brush pattern data. The reason for these routines is to paint the image of an edge pattern finely with a small brush and paint all other portions roughly with a large brush.

Meanwhile, attendant upon the determination made at step S6, the brush pattern selector 8 selects either the large brush pattern data or small brush pattern data. In either case the brush pattern data are composed of multi-valued image data (binary image data in another embodiment) of tones 0 through n, by way of example; essentially, plural types of these data are prepared. In the present embodiment, one type of large brush pattern data (hereinafter, both multi-valued and binary image data shall be referred to generally as brush pattern data) is stored in the internal ROM (not shown) of the brush pattern rotator 9, and three types of small brush pattern data are stored in the internal ROM (not shown) of the brush pattern selector 8. Directionless brush pattern data approximating a circle, vertical brush pattern data suitable for vertical edges and horizontal brush pattern data suitable for horizontal edges are stored as the small brush pattern data in such a manner that edge portions of the original image data can be painted appropriately.

Figure 6A:
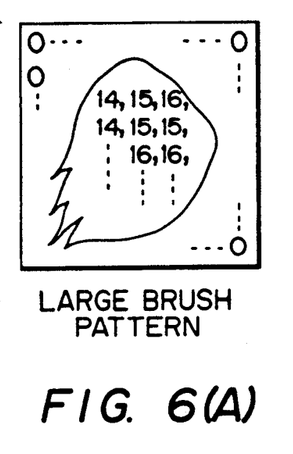
FIGS. 6(A) through (D) are views showing examples of multi-valued brush pattern data according to the embodiment of FIG. 1.
Figure 6B:
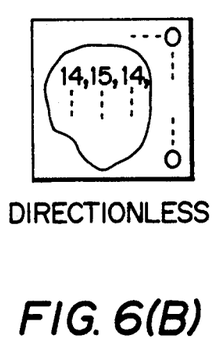
Figure 6C:
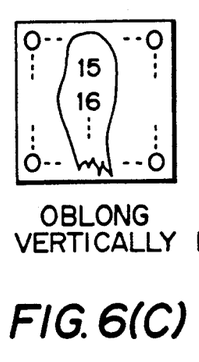
Figure 6D:
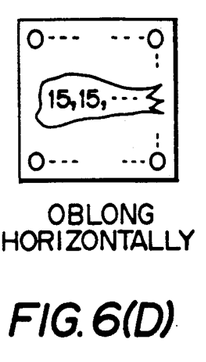

Examples of multi-valued brush pattern data of the embodiment are illustrated in FIGS. 6(A) through 6(D). FIG. 6(A) shows an example of large brush pattern data, 6(B) an example of small, directionless brush pattern data, 6(C) an example of small, vertically oblong brush pattern data, and 6(D) an example of small, horizontally oblong brush pattern data. These brush pattern data are composed of brush pattern data (achromatic data representing shape in this embodiment) which would literally be painted on a paper by applying coloring materials with a broad or fine brush. That is, when the direction in which a light beam is irradiated is added to an output image, the sensation of a build-up in luminance, the sensation of thickness or the sensation of unevenness along the direction of a brush stroke appear accordingly, and the shape of a brush pattern is such that a tail trails the stroke at its end. In the present embodiment, a typical example of such brush pattern data is, say, read from an actual pictorial sample image or generated by image processing and stored beforehand as luminance information, such as the built-up shape of a brush pattern.

Figure 6E:
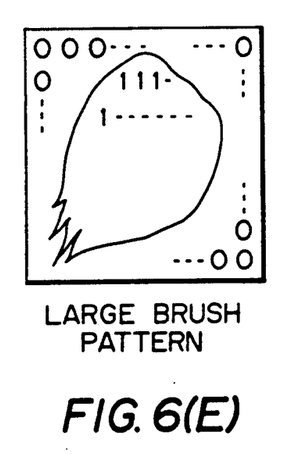
FIG. 6(E) through 6(H) are views showing examples of binary brush pattern data according to another embodiment of FIG. 1.
Figure 6F:
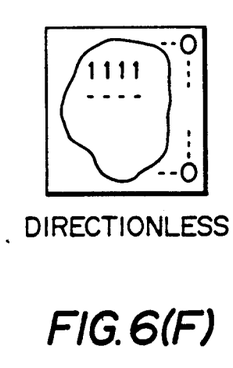
Figure 6G:
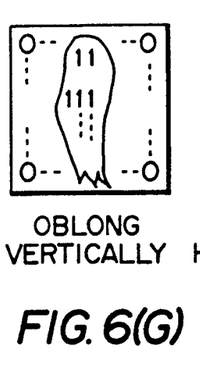
Figure 6H:
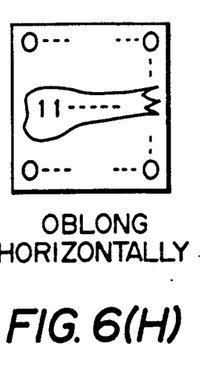

FIGS. 6(E) through 6(H) illustrate examples of binary brush pattern data according to another embodiment. FIG. 6(E) shows an example of large brush pattern data, 6(F) an example of small, directionless brush pattern data, 6(G) an example of small, vertically oblong brush pattern data, and 6(H) an example of small, horizontally oblong brush pattern data. These data are the same as in the case of the multi-valued pattern data except for the fact that there is no luminance build-up information.

STEP S7

Step S7 represents entry to the routine using the large brush pattern data. This step calls for a determination as to whether rotation processing applied to the large brush pattern data has ended. If rotation processing has ended, the program proceeds to step S9, at which painting processing of the large brush pattern data is executed. If rotation processing has not ended, the program proceeds to step S8, at which rotation processing is applied to the brush pattern data.

STEP S8

Rotation processing of the large brush pattern is executed at step S8. Accessing will be rapid if plural types of the large brush pattern data are stored in a ROM in advance In the present embodiment, however, in order to save on memory capacity, a single item of brush pattern data is rotated to obtain the same effect as preparing plural types of brush pattern data. The rotation processing is performed by the brush pattern rotator 9. For example, if the basic position of the large brush pattern data is assumed to be in the vertical direction, then the data is rotated sequentially one degree at a time within a range of ±20 degrees from the vertical direction.

It should be noted that ±20 degrees as the range of rotation takes into account the directions in which a brush is actually moved by an artist. With this range of rotation, no practical problems are encountered even if the effect of shadow due to the direction of the irradiating light beam is not changed.

More specifically, the coordinates (K,L) of brush pattern data subjected to rotation processing are obtained in accordance with Eq. (5) below.

$$\begin{bmatrix} K \\ L \end{bmatrix} = \begin{bmatrix} \cos\theta & \sin\theta \\ -\sin\theta & \cos\theta \end{bmatrix} \begin{bmatrix} I \\ J \end{bmatrix} + \begin{bmatrix} x_0(1-\cos\theta) - y_0\sin\theta \\ x_0\sin\theta + y_0(1-\cos\theta) \end{bmatrix} \quad (5)$$

where (I,J): coordinates of inputted brush pattern data
($x_0,y_0$): coordinates of center of rotation
$\theta$: angle of rotation Here the rotational angle $\theta$ is sequentially varied in increments of one degee. However, since the painting starting positions generated in step S5 are random, brush pattern data having random directions overall appear at random positions on the original image data R. Moreover, since rotation covers a range of only ±20 degrees, a certain degree of directionality remains even in terms of the entire image, so that it becomes possible to express the characteristics of brush strokes peculiar to a painted picture.

STEP S9

Figure 7A:
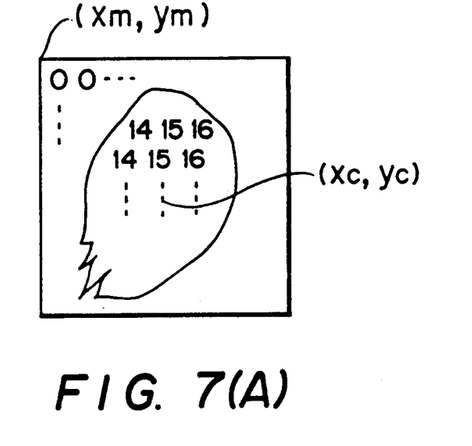
FIGS. 7(A) and (B) are views showing the relationship between a painting starting position $(x_m, y_m)$ and a central position $(x_c, y_c)$ of selected brush pattern data.

The painting unit 10 performs painting of the large brush pattern data at the painting starting positions generated in step S5. FIG. 7(A) is a view illustrating the relationship between a generated painting starting position ($x_m,y_m$) and the center position ($x_c,y_c$) of multi-valued pattern data. That is, the image data and multi-valued brush pattern data are positionally aligned so as to obtain the relationship shown in FIG. 7(A). More specifically, new write data $C_i(x',y')$ for painting are determined in accordance with Eq. (6) below.

$$C_i(x',y') = \frac{P(x,y)}{n-1} \times a_i(x_c,y_c) \quad (6)$$

where i: R, G, B
$a_i(x_c,y_c)$: original image data corresponding to the center position of the brush pattern data
P(x,y): multi-valued brush pattern data of relative address (x,y)
n: number of tones of brush pattern data
(x',y'): absolute address of original image data corresponding to relative address (x,y)

Specifically, Eq. (6) represents the color (i=R, G, B) and luminance of a pertinent brush pattern area by original image data $a_i(x_c,y_c)$ corresponding to the center position of the multi-valued brush pattern data. The periphery thereof is painted with a change applied by information P(x,y) indicative of paint material build-up of the multi-valued brush pattern data. The reason for dividing by (n−1) in Eq. (6) is to assure that the results of computation will be composed of eight bits. Thus, the computation of Eq. (6) is performed in order from the upper left of the multi-valued brush pattern data P(x,y) and a write operation corresponding to one pixel portion of the multi-valued brush pattern data is made in the high-order bit of the abovementioned pertinent address of image memory 14. The program then proceeds to step S10.

Figure 7B:
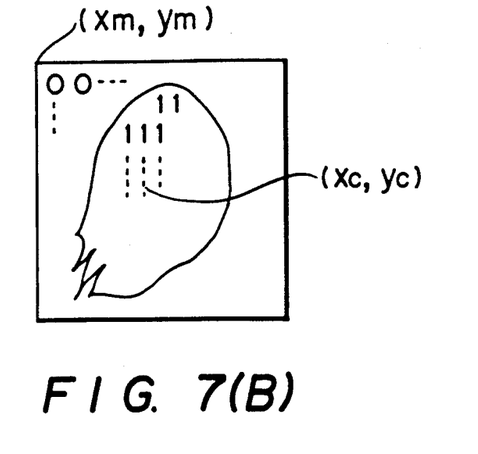

FIG. 7(B) illustrates another embodiment, in which the brush pattern data are expressed by binary values. In this case, Eq. (6) above is expressed as the following Eq. (6)':

$$C_i(x',y') = P(x,y) \times a_i(x_c,y_c) \quad (6)'$$

where P(x,y): binary brush pattern data of relative address (x,y)

More specifically, the color (i=R, G, B) and brightness of the relevant binary brush pattern area are represented by original image data $a_i(x_c,y_c)$ corresponding to the center position of the binary brush pattern data, and the portion P(x,y)=1 of the periphery is painted by this representative value.

In the above-described embodiment, the original image data $a_i(x_c,y_c)$ is extracted and painting of the multi-valued or binary brush pattern data P(x,y) is performed at the periphery thereof. However, the invention is not limited to this arrangement. Other options are to use a mean value of the periphery of the original image data $a_i(x_c, y_c)$, a mean value of the original image data coinciding with a position at which the multi-valued pattern data $P(x,y)$ is greater than a predetermined value or the binary brush pattern data $P(x,y)$ is "1", or a maximum or minimum value of these original image data.

STEP S10

This step calls for a determination as to whether painting has ended with regard to all pixels of the brush pattern data. If painting has not ended, the program returns to step S6. Accordingly, if edge data are encountered in the course of painting large brush pattern data, painting of the large brush pattern data ends at this time and the program proceeds to the steps from step S11 onward for painting processing of the small brush pattern data. This is because painting of edge portions takes precedence over other portions.

STEP S11

Figure 8:
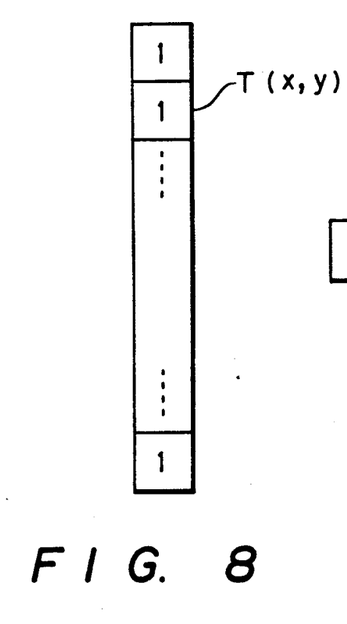
FIG. 8 is a view showing an example of an operator for detecting a vertical edge in an embodiment.
Figure 9:
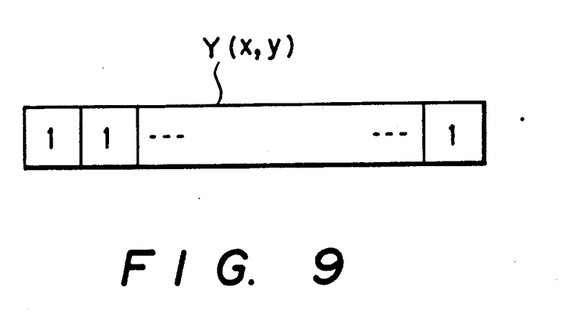
FIG. 9 is a view showing an example of an operator for detecting a horizontal edge in an embodiment.

The edge direction detector 11 detects the direction of the edge data recorded in the low-order bit of image memory 15, and the brush pattern selector 8 responds by selecting brush pattern data suited to the direction detected. Edge direction detection entails obtaining the logical product of a one-dimensional operator, such as shown for example in FIG. 8 or 9, and the edge data, comparing in the vertical and horizontal directions the numbers of pixels for which the result of the logical product is real, and rendering a decision to the effect that, when the difference between the compared numbers of pixels is greater than a certain value, the direction of the greater number of pixels is the edge direction. More specifically, an edge direction signal S is obtained in accordance with Eq. (7) below.

$$S = F[T(x,y) \cap E(x,y)] - F[Y(x,y) \cap E(x,y)] \quad (7)$$

where $E(x,y)$: edge data
  $T(x,y)$: vertical-direction operator
  $Y(x,y)$: horizontal-direction operator
  $\cap$: logical product
  $F[\ ]$: function for computing number of pixels for which the logical product is real Based on this edge direction signal S, the brush pattern selector 8 selects a "round pattern" if $-d \leq S \leq d$ holds, an "oblong horizontal pattern" if $S < -d$ holds, and an "oblong vertical pattern" if $d < S$ holds, where d is a predetermined number.

STEP S12

The painting unit 10 paints the brush pattern data selected in step S11. As a result, an edge portion is painted with directionality according to the small brush pattern data or slender brush pattern data. This makes it possible to obtain a sharp pictorial representation.

STEP S13

It is determined whether painting has ended with regard to all pixels of the small brush pattern data. The program returns to step S12 if painting has not ended, and proceeds to step S14 if painting has ended.

STEP S14

The CPU 1 determines whether the randomly generated set number of painting processing operations have been performed. The program returns to step S5 if the set number of processing operations have not ended, and proceeds to step S15 if they have ended.

STEP S15

The CPU 1 determines whether painting processing with regard to the three surfaces of the image data R, G, B has ended. If this processing has not ended, the program returns to step S5 to start the processing of the remaining surface. The abovementioned painting processing is performed in image memory 15 with regard to the original image data G and in image memory 16 with regard to the original image data B. The program proceeds to step S16 when painting processing of all surfaces ends.

STEP S16

The CPU 1 rewrites the contents of the LUT's 21-23 and performs a gray level conversion of the image data R, G, B for which painting has ended. FIG. 10 is a view showing an example the table conversion characteristics of LUT's 21-23. The horizontal axis in FIG. 10 indicates input tones 0-255 of the image data R, G, B for which painting has ended. It should be noted that the four low-order bit data of the image data R, G, B for which painting has ended are lost from the first by the processing of step S2 and therefore are meaningless. However, the output tones along the vertical axis of FIG. 10 are in a relation (0th-7th tones) in which the five low-order bits are neglected. Accordingly, the gray tone conversion of the image data R, G, B for which painting has ended is carried out in a proper manner. The image data R, G, B subjected to the gray tone conversion by the LUT's 21-23 are again stored in the image memories 14-16. This processing can be executed at high speed since it is performed in memory plane units.

STEP S17

Finally, the canvas image data in texture memory 17 and the image data in the image memories 14-16 are combined (synthesized). More specifically, image data $G_i(x,y)$ following combination is obtained in accordance with Eq. (8) below.

$$G_i(x,y) = aA_i(x,y) + bT(x,y) \quad (8)$$

where a, b: constants, in which $a + b = 1$
  i: R, G, B
  $A_i(x,y)$: image data in image memories 14-16
  $T(x,y)$: image data in texture memory 17

Figure 11:
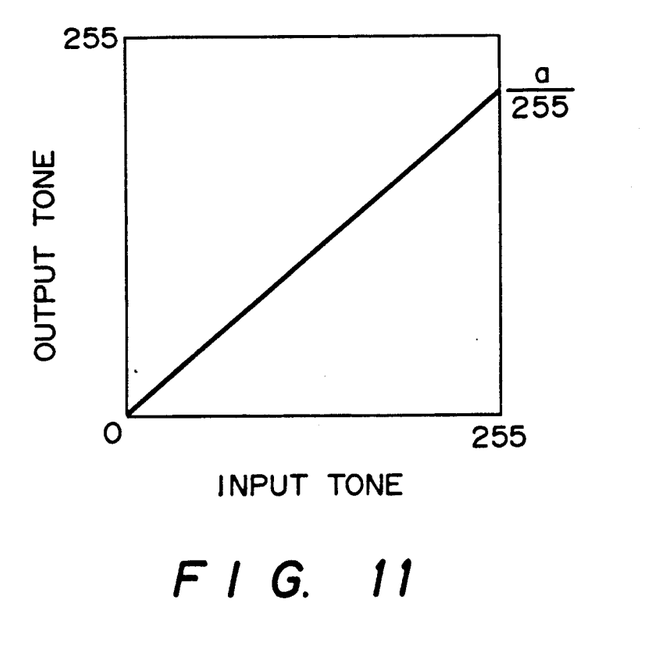
FIG. 11 is a view showing an example of a LUT conversion characteristic when performing texture image synthesis.

It should be noted that it is possible to store $[b \times T(x,y)]$ in the texture memory 17 in advance. Also, the computation $[a \times A_i(x,y)]$ can readily be performed by writing a conversion table of the kind shown in FIG. 11 into the LUT's 21-23 in advance. The addition of these two items of image data is performed throughout each of the memory planes R, G, B. As a result, the processing of step S17 is also executed in realtime.

According to the description of the foregoing embodiment, all of the painting processing is executed by digital computations. However, the invention is not limited to this arrangement. For example, an arrangement can be adopted in which a robot is made to hold several types of actual brushes and paint the abovementioned selected brush pattern data, or brush pattern data to which a rotational angle has been applied, at the abovementioned randomly generated painting positions.

In the above-described embodiment, brush pattern data are selected in dependence upon whether or not there is an edge which uses a one-dimensional operator, and the directionality of the edge. However, this does not limit the present invention. For example, an arrangement can be adopted in which the spatial frequency components of original image data are analyzed to determine the absence or presence of edges as well as the directionality thereof, on the basis of which the brush pattern data may be selected.

Further, the foregoing embodiment uses a differential operator having a (3×3)-pixel array for the purpose of edge extraction. However, the invention is not limited to such an arrangement, for the size and contents of the differential operator can be modified in dependence upon the pixel size of the original image and the size of the brush pattern data.

In the above embodiment, brush pattern data is used as multi-toned reference data. However, the present invention is not limited to this arrangement and it is obvious that the invention covers use of reference data (e.g., spatula pattern data or the like) employed in other applications.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for converting original image data into aesthetic image data having a pictorial touch, comprising the steps of:
   appointing an area which is at least a portion of the original image data;
   extracting information based on the original image data in said appointed area;
   obtaining synthesized painting data from said extracted information and other multi-toned sample painting data; and
   replacing the original image data in said appointed area with said synthesized painting data obtained.

2. The method according to claim 1, wherein the synthesized data are obtained by multiplying each item of pixel data contained in said multi-toned sample painting data by said extracted information.

3. The method according to claim 1, further comprising the steps of:
   providing plural types of sample painting data;
   detecting, for every locality, properties of said original image data; and
   selecting corresponding sample painting data from said plural types of sample painting data in dependence upon said detected properties.

4. An image processing method for converting original image data into aesthetic image data having a pictorial touch, comprising the steps of:
   (a) storing original image data in a memory;
   (b) extracting an edge portion with regard to said stored original image data,
   (c) randomly generating painting starting positions based on predetermined sample painting data;
   (d) determining whether said extracted edge portion is present at said generated painting starting positions or at positions in the course of painting processing;
   (e) if an edge portion is found not to be present by the determination of said step (d), executing painting processing for each pixel based on said sample painting data for a thick shape and returning to said step (d) until painting processing regarding the sample painting data for the thick shape ends, and returning to said step (c) at the end of painting processing; and
   (f) if an edge portion is found to be present by the determination of said step (d), executing painting processing based on said sample painting data for a fine shape, and returning to said step (c).

5. The method according to claim 4, further comprising the steps of:
   providing a single type of sample painting data for the thick shape;
   sequentially subjecting said single type of sample painting data for a thick shape to rotation processing at minute angular increments and within a range of a predetermined angle at maximum; and
   executing said rotation processing whenever painting processing ends with regard to said single type of sample painting data for the thick shape.

6. The method according to claim 4, further comprising the steps of:
   providing plural types of fine shape sample painting data having directionality;
   detecting the direction of said extracted edge portion; and
   selecting, in dependence upon the direction of said detected edge portion, corresponding sample painting data from said plural types of fine shape sample painting data having directionality.

7. An image processing apparatus for converting original image data into aesthetic image data having a pictorial touch, comprising:
   first memory means for storing original image data;
   second memory means for storing predetermined multi-toned sample painting data;
   area setting means for appointing an area which is at least a portion of the original image data stored in said first memory means;
   information extracting means for extracting information based on the original image data in the area appointed by said area setting means;
   arithmetic means for obtaining synthesized painting data from the information extracted by said information extracting means and the multi-toned sample painting data stored in said second memory means; and
   substituting means for replacing the original image data in the area appointed by said area setting means with the synthesized painting data obtained by said arithmetic means.

8. The apparatus according to claim 7, wherein said arithmetic means obtains the synthesized painting data by multiplying each item of pixel data contained in the multi-toned sample painting data stored in said second memory means by the information extracted by said information extracting means.

9. An image processing apparatus for converting original image data into aesthetic image data having a pictorial touch, comprising:
   first memory means for storing original image data;
   second memory means for storing plural types of sample painting data, each one of the plural types of sample painting data including multi-toned data;
   detecting means for detecting, for every locality, properties of the original image data stored in said first memory means;

selecting means for selecting corresponding sample painting data from the plural types of sample painting data in dependence upon the properties detected by said detecting means;

information extraction means for extracting information based on the original image data in an area detected by said detecting means;

arithmetic means for obtaining synthesized painting data from the information extracted by said information extraction means and sample painting data selected by said selecting means; and substitution means for replacing the original image data in the area detected by said detecting means with the synthesized painting data obtained by said arithmetic means.

10. An image processing apparatus for converting original image data into aesthetic image data having a pictorial touch, comprising:

first memory means for storing original image data;

second memory means for storing sample painting data for a thick shape and fine shape;

edge extracting means for extracting an edge portion with regard to the original image data stored in said first memory means;

position generating means for randomly generating painting starting positions based on the sample painting data;

decision means for determining whether the edge portion extracted by said edge extracting means is present at the painting starting positions generated by said position generating means;

selecting means for selecting the sample painting data for the thick shape if an edge portion is found not to be present by the determination performed by said decision means and the sample painting data for the fine shape if an edge portion is found to be present by the determination performed by said decision means;

information extracting means for extracting information based on the original image data in an area at a position generated by said position generating means;

arithmetic means for obtaining synthesized painting data from the information extracted by said information extracting means and the sample painting data selected by said selecting means; and substituting means for replacing the original image data in the area at the position generated by said position generating means with the synthesized painting data obtained by said arithmetic means.

11. The apparatus according to claim 10, wherein said second memory means stores plural types of fine shape sample painting data having directionality, and the apparatus further includes detecting means for detecting the direction of the edge portion extracted by said edge extracting means, wherein said selecting means selects, in dependence upon the direction of the edge portion detected by said detecting means when the edge portion is found to be present by the determination performed by said decision means, corresponding sample painting data from the plural types of fine shape sample painting data having directionality stored in said second memory means.

12. An image processing apparatus comprising:

dividing means for dividing an original image into blocks each composed of plural pixels;

detection means for detecting the edge direction of image from the original image;

selecting means for selecting corresponding multi-toned pattern data from plural prescribed multi-toned pattern data in accordance with the edge direction detected by said detection means; and mosaic processing means for mosaic processing the divided blocks based on the multi-toned pattern data selected by said selecting means.

13. An image processing apparatus comprising:

input means for inputting image data; and processing means for mosaic-processing said image data, using a multi-toned pattern.

14. The apparatus according to claim 13, wherein said multi-toned pattern comprises at least two multi-tone data having mutually-different density levels.

* * * * *

UNITED STATES PATENT AND TRADEMARK OFFICE
CERTIFICATE OF CORRECTION

PATENT NO. : 5,038,223

DATED : August 6, 1991

INVENTOR(S) : SHIGEKI YAMADA

It is certified that error appears in the above-identified patent and that said Letters Patent is hereby corrected as shown below:

ON THE TITLE PAGE,
IN [57] ABSTRACT

Line 10, "locality," should read --locality and--.

COLUMN 1

Line 47, "Application" should read --Applications--.

COLUMN 2

Line 3, "processsing" should read --processing--.
Line 9, "detected;" should read --detected:--.

COLUMN 5

Line 50, "(D)" should read --6(D)--.
Line 56, "(B)" should read --7(B)--.

COLUMN 8

Line 13, "produced" should read --products--.
Line 68, "memory 14" should read --memory 14.--.

COLUMN 9

Line 59, "patterns" should read --patterns.--.

COLUMN 11

Line 34, "advance" should read --advance.--.
Line 67, "degee." should read --degree.--.

UNITED STATES PATENT AND TRADEMARK OFFICE
CERTIFICATE OF CORRECTION

PATENT NO. : 5,038,223
DATED : August 6, 1991
INVENTOR(S) : SHIGEKI YAMADA

It is certified that error appears in the above-identified patent and that said Letters Patent is hereby corrected as shown below:

COLUMN 14

Line 58, "realtime." should read --real time.--.

COLUMN 15

Line 59, "data," should read --data;--.

COLUMN 16

Line 19, "processing" should read --¶ processing--.

Signed and Sealed this

Sixth Day of April, 1993

*Attest:*

STEPHEN G. KUNIN

*Attesting Officer*     Acting Commissioner of Patents and Trademarks